United States Patent [19]
Allen et al.

[11] Patent Number: 5,625,713
[45] Date of Patent: Apr. 29, 1997

[54] APPARATUS AND METHOD FOR INCREASING THE THROUGHPUT OF AN ACOUSTIC OR IMAGE COMPRESSION SYSTEM

[75] Inventors: James D. Allen, Santa Cruz; Martin P. Boliek, Palto Alto, both of Calif.

[73] Assignees: Ricoh Corporation, Menlo Park, Calif.; Ricoh Company, Ltd., Tokyo, Japan

[21] Appl. No.: 365,990

[22] Filed: Dec. 28, 1994

Related U.S. Application Data

[63] Continuation of Ser. No. 4,904, Jan. 21, 1993, abandoned, which is a continuation-in-part of Ser. No. 743,474, Aug. 9, 1991, abandoned.

[51] Int. Cl.$^6$ .............................. G06K 9/36; G06K 9/46
[52] U.S. Cl. .................... 382/232; 364/745; 364/749
[58] Field of Search ........................ 382/56, 33, 41, 382/43, 307, 232, 248, 250, 217, 222, 223, 276, 277, 280, 281, 302, 304; 364/745, 749; 341/60; 358/261.3, 261.4

[56] References Cited

U.S. PATENT DOCUMENTS

| | | | |
|---|---|---|---|
| 3,934,132 | 1/1976 | Desmonds | 364/745 |
| 4,449,194 | 5/1984 | Wilhelm | 364/725 |
| 4,507,676 | 3/1985 | Dischert et al. | 358/30 |
| 4,722,068 | 1/1988 | Kuroda et al. | 364/757 |
| 4,835,599 | 5/1989 | Sigel | 358/30 |
| 4,901,268 | 2/1990 | Judd | 364/745 |
| 4,916,657 | 4/1990 | Morton | 364/900 |
| 5,022,088 | 6/1991 | Hisada et al. | 382/235 |
| 5,070,532 | 12/1991 | Faul et al. | 382/166 |
| 5,081,607 | 1/1992 | Bates et al. | 364/749 |
| 5,172,237 | 12/1992 | Blonstein et al. | 358/261.3 |
| 5,189,636 | 2/1993 | Patti et al. | 364/749 |
| 5,218,647 | 6/1993 | Blonstein et al. | 382/166 |

OTHER PUBLICATIONS

Acheroy, M.; *Use of the DCT for the Restoration of an Image Sequence* SPIE vol. 593, Medical Image Processing, pp. 142–149 (1985, Bellingham, Washington).

Cooley, and Turkey, J. W.; *An Algorithm for (fast) Fourier Series* Mat Comput, XIX No. 90, pp. 296–301, (1965).

Chen, W., et al.; *A Fast Computational Algorithm for the DCT* IEEE Trans. Commun. vol. COM–25 No. 9, pp. 1004–1009 (1977).

Wu, H. R. and Paolini, F. J.; *On the Two Dimensional Vector Split–Radix FFT Algorithm* IEEE Transactions on Acoustics, Speech and Signal Processing, vol. 37, No. 2, pp. 1302–1304 (1989).

Lee, B. G.; *A Fast Cosine Transform* IEEE ASSP, vol. XXXIII pp. 28A. 3. 1–4 (1984).

Jalali and Rao; *Limited Wordlength and FDCT Processing Accuracy* IEEE ASSP–81, vol. III, pp. 1180–2 (1981).

Wu, H. R. and Paolini, F. J.; *A Structural Approach to Two Dimensional Direct Fast Discrete Cosine Transform Algorithms*, International Symposium on Computer Architecture and Digital Signal Processing, Hong Kong, pp. 358–362 (Oct. 1989).

(List continued on next page.)

*Primary Examiner*—Leo Boudreau
*Assistant Examiner*—Phuoc Tran
*Attorney, Agent, or Firm*—Blakely, Sokoloff, Taylor & Zafman

[57] ABSTRACT

An apparatus and method for increasing the throughput of a data processing system such as an acoustic or image compression system. An addition or subtraction of two pluralities of numbers is accomplished in parallel by combining numbers into a pair of "doublevectors," adding or subtracting the pair of doublevectors, and separating the resultant doublevector to provide values representative of the results of the addition or subtraction on the original plurality of numbers. Similarly, a left-shift of a plurality of numbers is accomplished by combining the numbers into a single doublevector, left-shifting the doublevector, and extracting a plurality of output values representative of the left-shifted values of the original numbers. Using additions, subtractions and shifts a linear transform such as the Generalized Chen Transform may be performed using doublevectors to provide a substantial increase in computation speed.

29 Claims, 5 Drawing Sheets

OTHER PUBLICATIONS

Wang, Z.; *Reconsideration of a Fast Computational Algorithm for the Discrete Cosine Transform* IEEE Trans. Commun. vol. COM-31, No. 1, pp. 121-123 (1983).

Mano, M. M.; *Computer System Architecture,* Second Edition, Sec. 4-4, pp. 125-127 (1982).

Mono, Computer System Architecture, 2nd ed, Prentice Hall (1982) pp. 125-127.

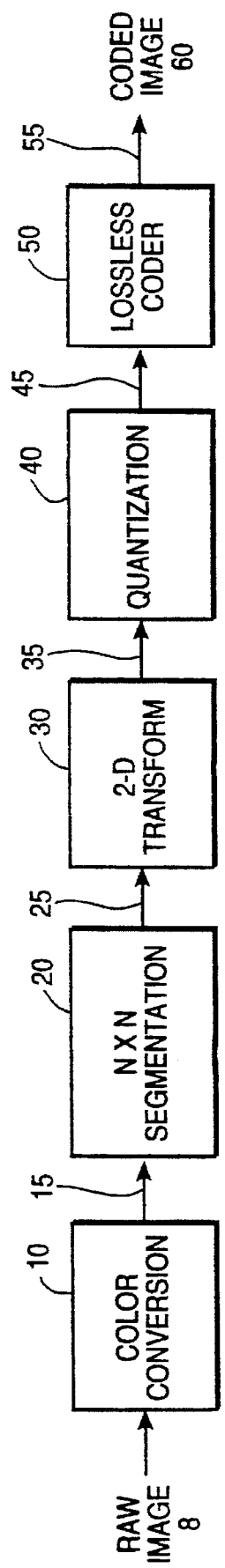
FIG_1A
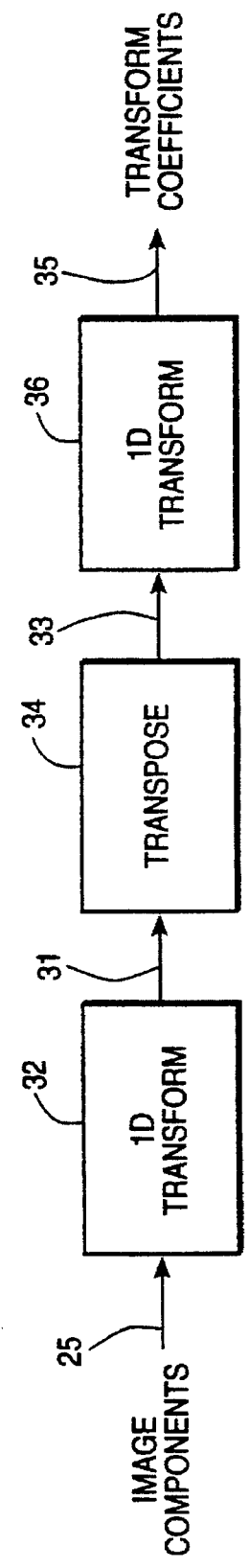
FIG_2

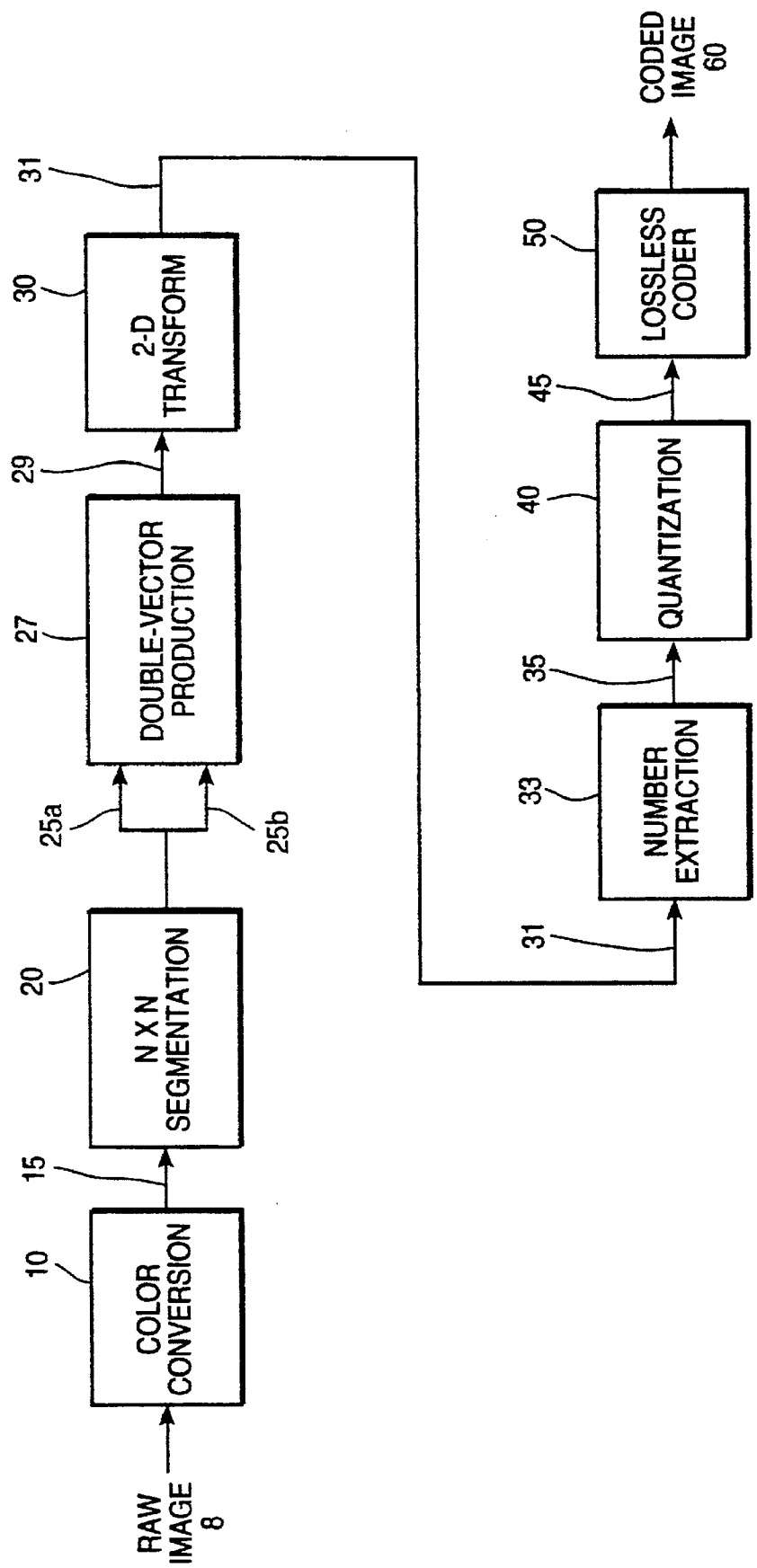
FIG_1B

LINEAR METHOD

```
  3      1    →  0011 0001
 +2     +1    →  0010 0001
 ___    ___      _____
  5      2       0101 0010
                     ↓
                  5    2
                (CORRECT)
```

```
 -3      1    →  1101 0001
 +2     +1    →  0010 0001
 ___    ___      _____
 -1      2       1111 0010
                     ↓
                 -1    2
                (CORRECT)
```

```
  3      1    →  0011 0001
 +2    +(-1)  →  0001 1111
 ___   _____     _____
  5      0       0101 0000
                     ↓
                  5    0
                (CORRECT)
```

```
  3     -1    →  0010 1111
 +2    +(-1)  →  0001 1111
 ___   _____     _____
  5     -2       0100 1110
                     ↓
                  5   -2
                (CORRECT)
```

PACKING METHOD

```
  3      1    →  0011 0001
 +2     +1    →  0010 0001
 ___    ___      _____
  5      2       0101 0010
                     ↓
                  5    2
                (CORRECT)
```

```
 -3      1    →  1101 0001
 +2     +1    →  0010 0001
 ___    ___      _____
 -1      2       1111 0010
                     ↓
                 -1    2
                (CORRECT)
```

```
  3      1    →  0011 0001
 +2    +(-1)  →  0010 1111
 ___   _____     _____
  5      0       0110 0000
                     ↓
                  6    0
               (INCORRECT)
```

```
  3     -1    →  0011 1111
 +2    +(-1)  →  0010 1111
 ___   _____     _____
  5      0       0110 1110
                     ↓
                  6   -2
               (INCORRECT)
```

FIG_3

| LINEAR METHOD | PACKING METHOD |
|---|---|

```
   LINEAR METHOD                      PACKING METHOD 3    1   →  0011 0001              3    1   →  0011 0001
   <<1  <<1  →       <<1              <<1  <<1  →       <<1
   ___  ___     _____              ___  ___     _____
    6    2      0110 0010              6    2      0110 0010
                   ↓                                  ↓
                 6   2                              6   2
               (CORRECT)                          (CORRECT)

3   -1   →  0010 1111              3   -1   →  0011 1111
   <<1  <<1  →       <<1              <<1  <<1  →       <<1
   ___  ___     _____              ___  ___     _____
    6   -2      0101 1110              6   -2      0111 1110
                   ↓                                  ↓
                 5  -2                              7  -2
              (INCORRECT)                        (INCORRECT)
```

FIG_4

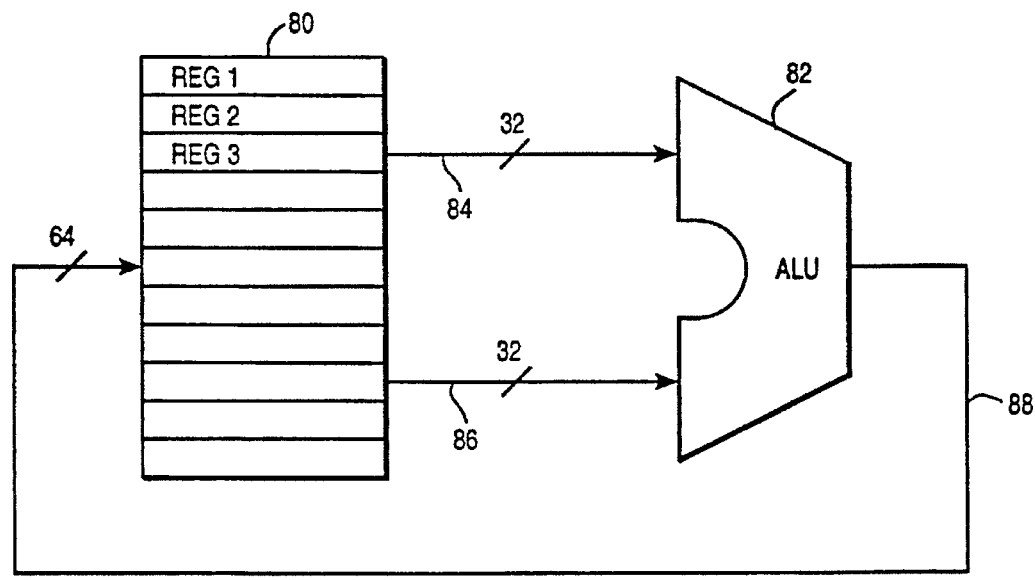
FIG_5
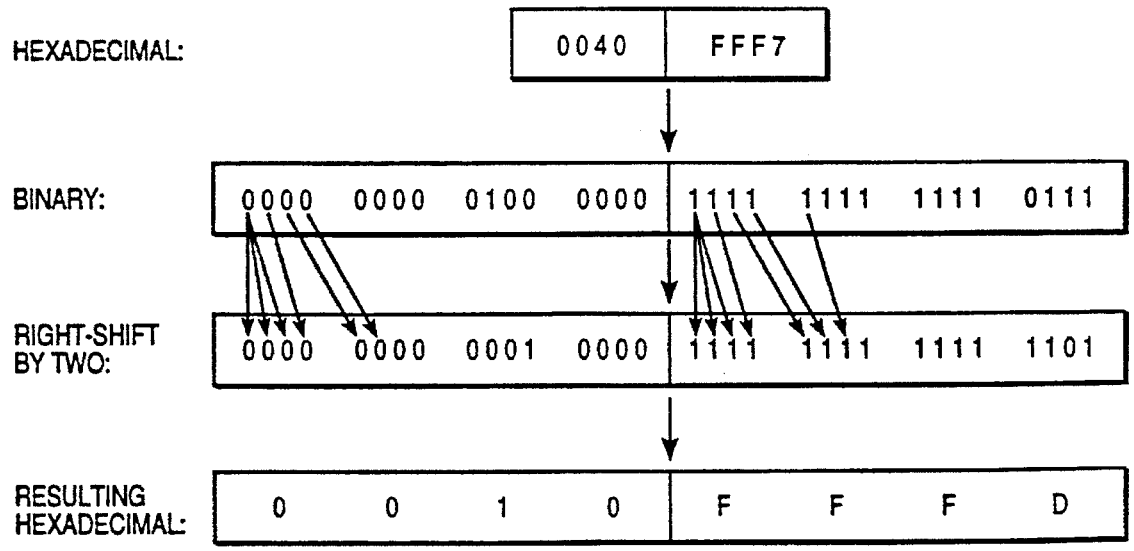
FIG_6

APPARATUS AND METHOD FOR INCREASING THE THROUGHPUT OF AN ACOUSTIC OR IMAGE COMPRESSION SYSTEM

CROSS-REFERENCE TO RELATED APPLICATIONS

This is a continuation of application Ser. No. 08/004,904, filed Jan. 21, 1993, now abandoned; which is a continuation-in-part of application Ser. No. 07/743,474, filed Aug. 9, 1991, now abandoned. The present application is related to U.S. Pat. No. 5,129,015, issued Jul. 7, 1992; to application Ser. No. 07/743,517, filed Aug. 9, 1991, now U.S. Pat. No. 5,319,724, which is a continuation-in-part of the aforementioned patent; and to application Ser. No. 07/811,468, filed Dec. 19, 1991, now U.S. Pat. No. 5,172,237, which is a continuation-in-part of the aforementioned application, all of which are entitled An Apparatus and Method for Compressing Still Images.

BACKGROUND OF THE INVENTION

The present invention relates to an apparatus and corresponding method for compressing image data, and an apparatus and method for increasing throughput of a processor involving additions, subtractions, and shifts.

The present invention is related to the above identified cross-referenced applications which are commonly owned by the same assignee as the present invention. The details of these cross-referenced applications are hereby incorporated by reference.

However, the aspects of the present invention are not limited to such image compression systems. Rather, the present invention is directed toward an apparatus and corresponding method for improving the throughput of a general data signal processing system, such as an acoustic data compression system.

In signal processing it is often necessary to perform time-consuming arithmetic. Today's general-purpose processors (such as the Motorola 68020) usually have 32-bit arithmetic data paths, but this is far more precision than is needed for important applications such as acoustic or image processing, such as with the present invention. It would be preferable to have less precision and more speed in such an acoustic or image processing environment.

For instance, the Generalized Chen Transform (GCT) described in the cross-referenced patent and patent applications may be implemented to perform an approximation to the discrete cosine transform (DCT) using only additions, subtractions and shifts, with a final multiply. An accuracy of 32-bits is not required to provide acceptable image quality. Therefore, the throughput of the GCT can be dramatically increased by combining two 16-bit words of data into each 32-bit word, processing the two 16-bit words in parallel in a 32-bit processor, and extracting two 16-bit words of output data. This process allows a single-instruction single-data (SISD) machine to operate as a single-instruction multiple-data (SIMD) machine.

SUMMARY OF THE INVENTION

It is an object of the present invention to provide an apparatus and corresponding method for compressing data, particularly still image data.

It is a more particular object to provide an apparatus and corresponding method for compressing acoustic or still images while increasing the throughput.

It is another object of the present invention to provide a method for adapting a single-instruction single-data machine to operate as a single-instruction multiple-data machine, thereby increasing throughput.

Additional objects, advantages and novel features of the present invention will be set forth in part in the description which follows and in part become apparent to those skilled in the art upon examination of the following, or may be learned by practice of the invention. The objects and advantages of the present invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the description, serve to explain the principles of the invention.

FIG. 1a shows a block diagram of the components of a standard compressor, and FIG. 1b shows a block diagram of the components of a compressor according to a preferred embodiment of the present invention.

FIG. 2 shows a block diagram of the components of a separable 2D transform unit.

FIG. 3 provides a comparison of the accuracy of addition operations according to two embodiments of the present invention.

FIG. 4 provides a comparison of the accuracy of left-shifts according to two embodiments of the present invention.

FIG. 5 schematically illustrates the circuitry of the present invention for implementation of additions and subtractions.

FIG. 6 shows an example of the right-shift operation utilizing the present invention.

DETAILED DESCRIPTION OF THE INVENTION

Before going into a detailed description of the aspects of the present invention, a brief overview of the cross-referenced patent and applications will be provided. However, as pointed out above, the present invention is not limited to such a compression system. Rather, the invention provides a method and apparatus whereby a number of input data quantities are combined to provide a lesser number of "doublevectors," operations are performed by the processor on the input doublevectors to provide output doublevectors, and a number of output data quantities are extracted from the output doublevectors, the number of output doublevectors being less than the number of output data quantities.

TRANSFORM IMAGE COMPRESSION BACKGROUND

Transform Image Compression compresses an image by transforming the values of sets of adjacent pixels into sets of transform coefficients. The advantage of this is that the values transform coefficients tend to be less correlated than that of the corresponding pixel values. Adjacent pixels in an image are usually of similar value, i.e. the "energy" distribution of pixels is relatively even. If the coefficients of a transform are very dissimilar or decorrelated, the transform provides good energy compaction. For the sam reconstructed signal quality, lossy quantization of transform coefficients results in much better compression than lossy quantization of the original data. (Or equivalently for the same amount of compression, lossy quantization of the transform coefficients results in better reconstructed signal quality than lossy quantization of the original data.)

An example of a typical Transform Image Compression system is shown in FIG. 1a. (Note that the JPEG Still Image Compression Standard baseline system is such a system). For a raw color image 8, the pixels are converted into an opponent color space, such as $YC_RC_B$, at the color conversion unit 10. Through the rest of the system, only one color component is processed at a time. Color converted image data 15 is then divided into N×N blocks, 8×8 blocks in the JPEG case, by the N×N segmentation unit 20. The N×N opponent color blocks 25 are then transformed at the two dimensional transform unit 30.

A good deal of computation can be saved if the two-dimensional transform can be performed by two passes through a one-dimensional transform. In this case the two-dimensional transform is termed a separable transform. FIG. 2 illustrates the circuit component for calculation of this type of transform. First, a one-dimensional transform is performed by the 1D transform unit 32 on N rows of 1×N image components 25. The resulting transform coefficients 31 are then transposed at transpose unit 34, and the new N rows of 1×N coefficients 33 are transformed at 1D transform unit 36 to provide a set of two-dimensional transform coefficients 35 which have been subject to a two-dimensional transform.

As shown in FIG. 1a, the blocks of transform coefficients 35 are then quantized at quantization unit 40. Quantization is produced by dividing each coefficient 35 by a known number. This reduces the number of bits that are required to encode quantized coefficients 45. (During decompression, the quantization is reversed by multiplication of the coefficients by the same known numbers.) It should be noted that it is likely that the exact transform coefficient values will not be recovered after dequantizing because of the truncation error produced by division of integers, thus, the quantization is "lossy." The quantized coefficients 45 are losslessly encoded by some algorithm, such as Huffman Coding, at the lossless coder 50 to provide a set of coded transform coefficients 55.

When implemented in software with a general microprocessor, the slowest part of this system is the transform itself. To get good energy compaction requires complicated transforms, such as the Discrete Cosine Transform (DCT). The mathematical computation requires significant processor time. Since shifts and adds can be performed much faster than multiplications, the speed of the calculation may be increased by replacing the slow computations, specifically multiplications, with additions, subtractions and shifts.

The Generalized Chen Transform, disclosed in U.S. Pat. No. 5,129,015 and incorporated herein by reference, uses only adds and shifts in the transform. All required multiplications of the transform are combined with the multiplications of the quantization so that the speed of the quantization is not decreased while the speed of the transform is greatly increased.

The present invention takes advantage of transforms like that GCT that have a great number of adds and shifts by allowing two blocks of components to be transformed in parallel with a conventional general microprocessor.

The Present Invention

An aspect of the present invention will now be described. In signal processing it is often necessary to perform time-consuming arithmetic. Today's general-purpose processors usually have 32-bit arithmetic data paths, but this is far more precision than is needed for important applications such as acoustic or image processing, such as with the present invention. It would be preferable to have less precision and more speed in such an acoustic or image processing environment.

The invention achieves this desirable object by packing a plurality of numbers into one 32-bit "doublevector." For example, four 8-bit data, or three 10-bit data (with two bits to spare), or two 16-bit data can be packed into a single 32-bit doublevector. Because left-shifts result in a reduction in precision, the transform process is preferably designed so that the significant bits of each component number is limited to, for instance, 14 bits the 32-bit doublevector is comprised of two 16-bit numbers.

A preferred embodiment of the present invention involving the use of the doublevector method to augment the speed of a two-dimensional transform in shown in FIG. 1b. The apparatus up to the N×N segmentation unit 20, and from the quantization unit 40 on, are the same as those of the standard compression apparatus of FIG. 1a. As shown in FIG. 1b, the output 25a and 25b of the N×N segmentation unit 20 consists of N×N pixel blocks. Adjacent pairs of pixel blocks 25a and 25b are combined at the doublevector production unit 27 to generate doublevectors 29. The doublevectors 29 are transformed at the two-dimensional transform unit 30 using additions, subtractions, and shifts to perform a GCT transform, as described in the above-referenced patent. The output doublevectors 31 are then decomposed to standard numerical form at the number extraction unit 33 to produce transform coefficients 35. The transform coefficients 35 are quantized and coded as described above.

Mechanics of the Invention

One object of the present invention is to perform a linear transform, such as the 8 component GCT transforms 32 and 36 of FIG. 2, at high speed on a 32-bit processor, such as the MC68020 manufactured by Motorola. In a preferred embodiment two standard numbers will be combined in 32-bit registers. Thus the SISD (single-instruction single-data) processor is effectively treated as a SIMD (single-instruction multiple-data) machine. A linear transform consists of additions, subtractions and multiplications by constants. The multiplies will be replaced with some combination of adds, subtracts, left-shifts, and right-shifts. Table lookups and multiplications are avoided.

Note that significant bits migrate to the left under additions and subtractions. For example, two numbers with six significant bits can be added to provide a number with seven significant bits, e.g.

```
  127 + 127      (decimal) = 254

0011    1111
 +  0011    1111   (binary)
    ────────────
    0100    0000.
```

The maximum magnitudes are known for any computational point in a transform, so therefore by design the magnitudes of numbers are restricted to prevent magnitude overflow. However, sign bits of negative numbers can migrate to the lower bits of the upper number of a doublevector. Depending on the size of the transform and the desired accuracy, a right-shift may be required to "re-center" the data. Instead of multiplying by 5, it may therefore be preferable to multiply a first quantity by 2.5, and a "partner" quantity by 2.0, with the knowledge that these two quantities will eventually be multiplied together after some divisions have also been performed on these quantities.

According to the present invention, an N-bit number A and an M-bit number B are combined to produce an (N+M)

-bit "doublevector" number C. The relation between the doublevector C and its component numbers, A and B, is represented by the notation C=[A, B]. Once the doublevector numbers are constructed, they are subject to a series of operations (most of which are simply normal arithmetic operations) to produce a doublevector output, and the doublevector output is then decomposed to provide component numbers. For instance, the additions $$X=A1+A2$$

and $$Y=B1+B2,$$

may be performed simultaneously by generating the doublevectors $$C1=[A1, B1],$$

and $$C2=[A2, B2],$$

performing an addition of the two doublevectors $$Z=C1+C2=[X, Y],$$

and extracting the results X and Y from the doublevector Z. Subtraction is performed in an analogous way.

Similarly, a left shift by n bits of two (monovector) numbers A and B may be performed simultaneously by defining the doublevector $$C=[A,B],$$

performing the left shift on C to provide an output doublevector C', $$C'=C<<n,$$

where "<<n" represents a left shift by n bits, and packing with zeros on the right, and decomposing the doublevector C' to provide A' and B' where C'=[A', B'], and $$A'=A<<n, B'=B<<n.$$

A first method for generating doublevectors is termed the linear method. According to the linear method the doublevector C generated from the m-bit number A and the n-bit number B is defined by $$C=[A,B]=A*2^n+B.$$

The extraction of A and B from C is given by $$B=C-((C>>n)*2^n),$$

and $$A=(C-B)/2^n,$$

where ">>n" indicates a right-shift by n bits and extending the sign bit on the left. In the preferred embodiment A and B are 16-bit two's-complement signed integer numbers, C is a 32-bit doublevector, and $$C=[A,B]=A*2^{16}+B.$$

The extraction is then given by $$B=C-((C>>16)*2^{16}),$$

and $$A=(C-B)/2^{16},$$

(or equivalently A=C>>16, or any other equivalent combination of arithmetic and Boolean operations).

For instance if $$A=0\text{x}0041=65$$

$$B=0\text{x}FFF7=-9,$$

then $$C = [A,B] = (65 \times 2^{16}) - 9$$
$$= 0\text{x}0040\,FFF7,$$

where numbers with a "0x" prefix are written in hexadecimal notation.

Using the linear method the addition of the two 16-bit numbers 0x0041 and 0x0041 can be combined with the addition of the two 16-bit numbers 0xFFF7 and 0xFFF7, by performing the addition of the two 32-bit doublevectors, i.e.

```
  0x0040  FFF7
+ 0x0040  FFF7
  0x0081  FFEE
```

The resulting sum is then decomposed according to the above method to provide the sums 0x0081=129, and 0xFFEE=−18.

Another method of generating doublevectors is termed the packing method. The (m+n)-bit doublevector C is generated from the m-bit number A and the n-bit number B according to the packing method by $$C=(A<<n)|B,$$

where as in the C programming language, "|" represents the bitwise OR operation. Therefore A is placed directly in the high-order portion of C, and B is placed in the n least significant bits of C. The inverse operation is simply $$A=C>>n,$$

and $$B=C\&(2^n-1),$$

where as in the C programming language, "&" represents the bitwise AND operation. In particular, in the preferred embodiment where A and B are 16-bit numbers $$C=(A<<16)|B,$$

and the inverse operation is $$A=C>>16,$$

and $$B=C\&FFFF.$$

For instance, if A=0x0041 and B=0xFFF7, then C=0x0041 FFF7. It should be noted that although the quantities A, B and C above have been considered to be numbers, the linear and packing methods may also be applied to arrays or matrices.

With the packing method the addition of the two 16-bit numbers 0x0041 and 0x0041, and the addition of the two 16-bit numbers 0xFFF7 and 0xFFF7 is transformed into the addition of the two 32-bit doublevectors 0x0041 FFF7 and 0x0041 FFF7 to provide 0x0083 FFEE, which can be decomposed to provide the sums 0x0083=131 and 0xFFEE= −18. This example illustrates that the packing method sometimes produces errors in the least significant bit of the number placed in the high-order portion of the doublevector. The linear method does not suffer from this problem. However, the packing method is more rapid than the linear method since shifts, OR's, and AND's are quicker than multiplications and additions.

FIG. 3 provides a comparison of the results of additions for pairs of 4-bit numbers in 8-bit doublevectors using the linear method and the packing method. Whereas the first two sets of additions [(3+2) and (1+1), and (−3+2) and (1+1)] produce correct results with both the linear method and the packing method, the last two sets of additions [(3+2) and (1+{−1}), and (3+2) and (−1+{−1})] produce correct results with the linear method and incorrect results with the packing method. In general, a negative number in the low-order portion of a doublevector will introduce an error in the least significant bit of the number in the high-order portion of the doublevector. Usually the numbers stored in the doublevectors are large and such errors do not significantly affect the computation. Another method is to adjust the numbers so there are extra digits on the right side (to the right of the binary point).

A schematic of the circuitry for performing doublevector addition or subtraction operations is shown in FIG. 5. The storage register array 80 stores 32-bit doublevectors which have been generated using the linear method or the packing method. Pairs of 32-bit doublevectors chosen from the registers 80 according to the specifics of the calculation are directed over 32-bit lines 84 and 86 to an arithmetic logic unit (ALU) 82. The ALU 82 may be a Motorola MC68020, or any other 32-bit processor such as the Intel 80386 or 80486, the MIPS R3000, or a processor from the Sun SPARC family. The output of the ALU 82 is a 64-bit number which is directed over a 64-bit line 88 to a chosen register in the array 80. The number stored in the register is trimmed to a 32-bit number (which in this case is a doublevector) by discarding the upper 32 bits.

A comparison of the results of left shifting using the linear method and the packing method is provided in FIG. 4. When the number in the low-order portion of the doublevector is positive, as in the first example [(3<<1) and (1<<1)], then both the linear method and the packing method produce correct results. However, when the number in the low-order portion of the doublevector is negative, as in the second example [(3<<1) and (1<<1)], an error is introduced in the least significant bit of the number in the high-order portion of the doublevector using both the linear method and the packing method. It should be noted that left-shifts may cause the sign reversal of components of a doublevector just as left-shifts may cause the sign reversal of conventional two's-complement binary numbers. Generally, numbers stored in m-bit registers are (m-k) bit numbers and are shifted left by no more than k bits to prevent overflow.

The performance of a right-shift on doublevectors is different than a left-shift because when a right-shift is performed, the sign bit of the number in the low-order portion of the doublevector must be preserved. Suppose we want to right-shift by two bits the doublevector C=0x0040 FFF7 formed by the packing method from the two 16-bit numbers $A = 0x0040 = 64$ and $B = 0xFFF7 = -9.$ A conventional 32-bit right-shift yields $C >> 2 = 0x0010\ 3FFD,$ and the component numbers by the packing method are 16 and +16,381, whereas a 2-bit right-shift performed directly on the component numbers yields 16 and −3. This discrepancy in sign is unacceptable.

As shown in FIG. 6, a proper right shift of a doublevector maintains the sign bits of each number component of the doublevector by replicating the sign bit of each number component. In this instance the high-order bits (including the sign bit) of the number in the low-order portion of the doublevector must remain as 1's, and the proper result is 0x0010 FFFD.

Using the 1MC68000 instruction set, for example, a proper right-shift of a doublevector requires the sequence of commands asrw 2,C; swap C; asrw 2,C; swap C where the swap C command swaps the upper and lower 16 bits of the 32-bit doublevector C, and the (asrw 2, C) command is an arithmetic right-shift by 2 bits on the lower 16 bits of C. This sequence of operations maintains the sign of the number in the lower 16 bits of the doublevector. It should be noted that if multiple right-shifts are to be performed on a doublevector, only the first swap in each asrw/swap/asrw/swap sequence need be performed; then a final swap may be necessary if an odd number of right-shifts were performed.

An Example

Using the doublevector method of the present invention, the linear transform $$\begin{vmatrix} x_1' \\ y_1' \end{vmatrix} = M \begin{vmatrix} x_1 \\ y_1 \end{vmatrix},$$

may be combined with the transform $$\begin{vmatrix} x_2' \\ y_2' \end{vmatrix} = M \begin{vmatrix} x_2 \\ y_2 \end{vmatrix},$$

by defining the doublevectors p=[x$_1$, x$_2$] and q=[Y$_1$, Y$_2$], performing the computation $$\begin{vmatrix} p' \\ q' \end{vmatrix} = M \begin{vmatrix} p \\ q \end{vmatrix},$$

and extracting the solutions x$_1$', x$_2$', y$_1$' and y$_2$' by the relations p'=[x$_1$, x$_2$'] and q'=[Y$_1$', Y$_2$'].

For instance, consider the linear transformation matrix $$M = \begin{vmatrix} 1.5 & 3 \\ 2.25 & 1 \end{vmatrix}.$$

Because the entries of M are simple rational numbers the matrix operation M on (x$_1$, y$_1$)T can be performed by a combination of additions, subtractions, left-shifts, and right-shift, i.e.

$$M \begin{vmatrix} x_1 \\ y_1 \end{vmatrix} = \begin{vmatrix} x_1 + x_1 >> 1 + y_1 << 1 + y_1 \\ x_1 << 1 + x_1 >> 2 + y_1 \end{vmatrix}.$$

If the transform M is to be performed on the pair of 1×2 matrices $(x_1, y_1)^T$ and $(x_2, y_2)^T$, then the calculation time may be reduced by calculating $$\begin{vmatrix} p' \\ q' \end{vmatrix} = \begin{vmatrix} p + p >> 1 + q << 1 + q \\ p << 1 + p >> 2 + q \end{vmatrix},$$

and extracting the number components of p' and q'. Note that there is no need for addressing of the components of a doublevector during a doublevector calculation until the final stage when the component numbers are extracted. (Because the calculation of the two entries of $(p',q')^T$ each include one right-shift but the right-shifted quantities are added to quantities which are not right-shifted, no swaps may be omitted.)

Use of the Invention for Transform Image Coding

Many useful transforms require multiplications by irrational numbers and cannot be reduced to adds, subtracts, and shifts. However, since the GCT transform performed at transform units 32 and 36 of FIG. 2 will permit factoring such that these irrational multiplications may be combined with the quantization operation at quantization unit 40. The multiplications involve no additional computation. Note that for an N-dimensional transform, these multiplications can be coalesced such that their total cost is one-per-point instead of N-per-point. The remaining entries in the transform matrix may be replaced with rational numbers without losing the orthogonality of the transform. Useful transforms with this property include the Fast Hartley, Discrete Sine, and Discrete Cosine Transforms.

For the important image compression standard known as "JPEG" (Joint Photographic Experts Group) an approximation of the discrete cosine transform, adequate even for medical use, is given by the GCT transform, as described in the above-cited patent, using the substitutions for entries in the transform matrix listed in Table 1.

TABLE 1

| Irrational Trigonometric Form | Rational Form |
|---|---|
| a = tan (5 pi/16) = 1.4966 | a = 1.5 |
| b = tan (6 pi/16) = 2.4142 | b = 2.4 |
| c = tan (7 pi/16) = 5.0273 | c = 5.0 |
| r = sqrt (2) = 1.4142 | r = 181/128 = 1.4141 |

Hence useful transforms can be performed using simple rational numbers. The multiplies can be implemented as additions and shifts thereby allowing the application of the present invention. For instance, a multiplication by $1/\sqrt{2}$ ($\approx 0.70711$) required by the GCT can be done with table-lookups, but using shifts and adds the multiplication can be implemented by 0.70711*A=((A+A>>5)>>1)*(1+>>2)+A>>4.

Set forth in Table 2 is a list of arithmetic primitives with their costs using both the standard approach and the approach of the present invention.

TABLE 2

| | Cost Per Two Operations: | |
|---|---|---|
| Operation | Conventional | Present invention |
| Add | 2 adds | 1 add |
| Subtract | 2 subtracts | 1 subtract |
| Left shift | 2 left-shifts | 1 left-shift |
| Right-shift | 2 right-shifts | 2 right-shifts +1 or 2 swaps |
| Multiply | 2 multiplies | extraction +2 multiplies +recombination |
| Table lookup | 2 lookups | extraction +2 lookups +recombination |

With the preferred embodiment of the present invention, additions, subtractions and left shifts of numbers of 16-bits or less are performed with twice the usual throughput by standard addition, subtraction and left-shift operations, respectively, on 32-bit doublevectors. Right-shifts on a doublevector requires one or two more operations than on normal numbers.

Lookups and multiplications of doublevectors are not used in the preferred embodiment of the present invention. If multiplications and table lookups were to be performed on doublevectors the number components of the doublevectors are extracted, then the operation performed on the number components, and finally, the numbers are recombined into doublevectors for further processing. (Note that table lookups of 32-bit doublevectors would require a prohibitively large table ($2^{32}$ entries), and the multiplication of two 16-bit numbers generally produces a result with 32 significant bits, so the direct multiplication of doublevectors corrupts the data.)

As shown in Table 3, the method of the present invention reduces the number of additions, subtractions and left-shifts by a factor of two for a GCT transform on two 8×8 pixel blocks.

In the preferred embodiment for the MC68020, the packing method is used on the forward side of the transform process, and the linear method is used on the inverse side of the transform process. In the forward transform operation 8-bit pixel components are transformed to 11-bit coefficients, so errors in the least significant digit have a magnitude of only (1/2048). However, in the inverse transform operation 11-bit pixel components are transformed to 8-bit coefficients, so errors in the least significant digit have a magnitude of (1/256). Therefore the accuracy of the forward transform may be sacrificed for the sake of speed.

TABLE 3

| Math Operation | 2 GCT blocks | 2 BCT blocks using invention |
|---|---|---|
| Add/Subtract | 1408 | 704 |
| Left shifts | 224 | 112 |
| Right-shifts | 704 | 704 |

The error induced in the application of a forward and inverse transform may be decomposed into systematic error induced by precision constraints of integer arithmetic, quantization error, and the above-described errors related to the packing operation. For typical quantization the magnitude of the quantization error is much greater than the other to forms of error. Therefore, in practice the above-described method and apparatus prove useful.

After the transform of the doublevector pixel data by the transformunits 32 and 36 the data is transformed back to standard numbers for processing through the remainder of the compression system.

The foregoing description of the preferred embodiment of the invention has been presented for purposes of illustration and description. It is not intended to be exhaustive or to limit the invention to the precise form disclosed, and many modifications and variations are possible in light of the above example. Also, the present invention is compatible with existing standards, such as JPEG (Joint Photographic Experts Group). The present invention may also be adapted for sign-magnitude binary numbers. The preferred embodiment was chosen and described in order to best explain the principles of the invention and its practical applications to thereby enable others skilled in the art to best utilize the invention and various embodiments and with various modifications as are suited to the particular use contemplated. Many other variations are possible. For instance, although the majority of the present disclosure has addressed computations involving doublevectors, vectors with more than two numbers may be composed. (The term "doublevector" has only been used for convenience.) For example, the DEC Alpha series has 64-bit mathematics and so vectors containing four numbers may be used according to the present invention. Although the present invention has been presented in the context of transforms for data compression, the present invention is useful for other types of transforms, such as spectral analysis. Although the present invention has been discussed in the context of transforms, it may be used for other types of mathematical operations. Although particular combinations of arithmetic and Boolean operations have been provided for the linear and packing methods, any other equivalent combination of operations may be substituted. Although two doublevector methods have been detailed, other related methods may also be used. It is intended that the scope of the invention be defined only by the claims appended hereto.

What is claimed is:

1. An arithmetic processor comprising:

a first data register means having a bit length of R1 bits;

means for combining first and second multi-bit data numbers into a first packed word having a first high-order portion and a first low-order portion and being stored in said first register means and combining third and fourth data numbers into a second packed word having a second high-order portion and a second low-order portion, said first and second multi-bit data numbers having bit lengths of N1 and N2, said first packed word having a bit length of P1 such that $P1 \geq N1+N2$, said third and fourth multi-bit data numbers having bit lengths of N3 and N4, said second packed word having a bit length of P2 such that $P2 \geq N3\ N4$, said first data number being directed to said first low-order portion of said first packed word, said second data number being directed to said first high-order portion of said first packed word, said third data number being directed to said second low-order portion of said second packed word, and said fourth data number being directed to said second high-order portion of said second packed word;

a single-instruction single-data arithmetic logic unit of bit length L1 for additions and subtractions with an unbroken carry chain of contents of said first packed word in said first multi-bit register means with said second packed word to produce a third packed word of bit length P3, where $L1 \geq P1$, $L1 \geq P2$, and $L1 \geq P3$;

means for directing said first packed word stored in said first register means and said second packed word to said single-instruction single-data arithmetic logic unit to produce said third packed word; and means for extracting a first output number of bit length N5 from a third low-order portion of said third packed word and extracting a second output number of bit length N6 from a third high-order portion of said third packed word where $P3 \geq N5+N6$.

2. The system as in claim 1 wherein said first and third low-order and high-order portions of said first and third packed words, respectively, comprise a first half and a second half thereof.

3. The system as in claim 2 wherein $P1=P2=P3=32$.

4. The system as in claim 3 wherein $N1=N2=N3=N4=N5=N6=16$.

5. An apparatus comprising:

a first multi-bit data register means of bit length R1;

means for combining first and second multi-bit data numbers into a first packed word in said first register means and combining third and fourth multi-bit data numbers into a second packed word said first packed word having a bit length of P1 and said first and second multi-bit data numbers having bit lengths of N1 and N2, respectively, such that $P1 \geq N1+N2$, said second packed word having a bit length of P2 and said third and fourth multi-bit data numbers having bit lengths of N3 and N4, respectively, such that $P2 \geq N3+N4$;

a single-instruction single-data arithmetic logic unit of bit length L1 for adding or subtracting with an unbroken carry chain contents of said first packed word in said first multi-bit register means and said second packed word to produce a third packed word of bit length P3, where $L1 \geq P1$, $L1 \geq P2$, and $L1 \geq P3$, functional relationships between each pair of functionally adjacent bit processors in said arithmetic logic unit being the same;

means for directing said first packed word stored in said first register means and said second packed word to said arithmetic logic unit to generate said third packed word; and means for extracting first and second output numbers from said third packed word, said first output number having a bit length of N5 and said second output number having a bit length of N6, and P3 24 N5+N6.

6. A single-instruction multiple-data arithmetic processor for performing a functional operation f() on a first number A to provide a first result $X=f(A)$, and performing said functional operation f() on a second number B to provide a second result $Y=f(B)$, said functional operation f() being a shift operation said first number being an n-bit number and said second number being an m-bit number comprising:

means for doublevector production producing a q-bit doublevector C from said first number A and said second number B, where $q \geq m+n$;

a p-bit single-operation single-data arithmetic logic unit providing said functional operation f() on said doublevector C to provide an r-bit output doublevector $Z=f(C)$, functional relationships between functionally adjacent pairs of bit processors in said arithmetic logic unit being the same, where $p \geq q$ and $p \geq r$;

means for number extraction from said output doublevector Z to provide said first result X and said second result Y, whereby said first number A is related to said first result X, and said second number B is related to said second result Y by a multiplication or division by a power of two, said first result X is an s-bit number and said second result Y is a t-bit number, and $r \geq s+t$.

7. The processor of claim 6 wherein said functional operation f() is a left-shift operation.

8. The processor of claim 6 wherein n=m=s=t=16.

9. The processor of claim 6 wherein said doublevector C is generated from said first number A and said second number B according to the relation $$C=A*2^n+B.$$

10. The processor of claim 9 wherein said first result X and said second result Y are extracted from said output doublevector Z according to the relations $$Y=Z-((Z>>n)*2^n),$$

and $$X=(Z-Y)/2^n.$$

11. The processor of claim 6 wherein said doublevector C is generated from said first number A and said second number B according to the relation $$C=(A<<n)|B,$$

where "|" represents a bitwise OR Operation.

12. The processor of claim 11 wherein said first result X and said second result Y are extracted from said output doublevector Z according to the relations $$Y=Z\ \&\ (2^n-1),$$

where "&" represents a bitwise AND operation, and $$X=Z>>n.$$

13. The processor of claim 6 wherein said functional operation f() is a right-shift operation.

14. The processor of claim 6 wherein said functional operation f() is a right shift and said doublevector C includes extra bits to the right of said first and second numbers A and B in said doublevector C so q>m+n.

15. The processor of claim 6 wherein said functional operation f() is a left shift and said doublevector C includes extra bits to the left of said first and second numbers A and B in said doublevector C so q>m+n.

16. An arithmetic processor for performing a functional operation f() on a first n-bit number A1 and a second n-bit number A2 to provide a first n-bit result X=f(A1, A2), and performing said functional operation f() on a third m-bit number B1 and a fourth m-bit number B2 to provide a second m-bit result Y=f(B1, B2), comprising:
  means for doublevector production said means producing a first doublevector C1 from said first number A1 and said third number B1, and a second doublevector C2 from said second number A2 and said fourth number B2, said first and second doublevectors C1 and C2 having bit lengths of p and q, respectively, where p≧n+m and q≧m+n;
  a single-instruction single-data r-bit arithmetic logic unit providing said functional operation f() on said first doublevector C1 and said second doublevector C2 to provide an output doublevector Z=f(C1,C2) of bit length s, where said functional operation f() is an addition or subtraction with an unbroken carry chain, and r≧p, r≧q, and r≧s;
  means for number extraction from said output doublevector Z to provide said first result X and said second result Y, whereby said processor functions as a single-instruction multiple-data machine.

17. The processor of claim 16 wherein said functional operation f() is addition.

18. The processor of claim 16 wherein said functional operation f() is subtraction.

19. The processor of claim 16 wherein n=16 and m=16.

20. The processor of claim 16 wherein said first doublevector C1 is generated from said first number A1 and said third number B1 according to the relation $$C1=A1*2^n+B1,$$

and said second doublevector C2 is generated from said second number A2 and said fourth number B2 according to the relation $$C2=A2*2^n+B2.$$

21. The processor of claim 20 wherein said first result X and said second result Y are extracted from said output doublevector Z according to the relations $$Y=Z-((Z>>n)*2^n),$$

and $$X=(Z-Y)/2^n.$$

22. The processor of claim 16 wherein said first doublevector C1 is generated from said first number A1 and said third number B1 according to the relation $$C1=(A1<<n)|B1,$$

and said second doublevector C2 is generated from said second number A2 and said fourth number B2 according to the relation $$C2=(A2<<n)|B2,$$

where "|" represents a bitwise OR operation.

23. The processor of claim 22 wherein said first result X and said second result Y are extracted from said output doublevector Z according to the relations $$Y=Z\ \&\ (2^n-1),$$

where "&" represents a logical AND operation, and $$X=Z>>n.$$

24. The processor of claim 16 wherein said functional operation f() is an addition or subtraction said first doublevector C1 includes extra bits to the left of said first and third numbers A1 and B1 so p>m+n, and said second doublevector C2 includes extra bits to the left of said second and fourth numbers A2 and B2 so q>m+n.

25. A data processor for computation of a transform on a first input data array $X_1$ of numbers of bit length N1 to generate a first output data array of numbers of bit length M1, and computation of said transform on a second input data array $X_2$ of numbers of bit length N2 to generate a second output data array of numbers of bit length M2, comprising:
  means for production of an input doublevector array Y of numbers of bit length P1 from said first data array $X_1$ and said second data array $X_2$, where P1≧N1+N2;
  means for computation of said transform on said input doublevector array Y in a single-instruction single-data L1-bit arithmetic logic unit to produce an output doublevector data array of numbers of bit length P2 by a series of arithmetic and Boolean operations, said transform utilizing additions and subtractions with unbroken carry chains, where L1≧P1, L1≧P2, and P2≧M1+M2; and means for extraction of said first and second output data arrays from said output doublevector data array.

26. The processor of claim 25 wherein said series of operations includes additions, subtractions and shifts, but includes no multiplications.

27. The processor of claim 26 wherein said transform is a Generalized Chen Transform.

28. The processor of claim 27 wherein said means for production produces said input doublevector Y according to $$Y=X_1*2^n+X_2.$$

29. The processor of claim 27 wherein said means for production produces said input doublevector Y according to $$Y=(X_1<<n)|X_2,$$

where "|" represents a bitwise OR operation.

* * * * *